(12) United States Patent
Nori et al.

(10) Patent No.: US 10,846,084 B2
(45) Date of Patent: Nov. 24, 2020

(54) SUPPORTING TIMELY AND CONTEXT TRIGGERED PREFETCHING IN MICROPROCESSORS

(71) Applicant: Intel Corporation, Santa Clara, CA (US)

(72) Inventors: Anant Vithal Nori, Bangalore (IN); Sreenivas Subramoney, Bangalore (IN); Shankar Balachandran, Bangalore (IN); Hong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 15/861,370

(22) Filed: Jan. 3, 2018

(65) Prior Publication Data
US 2019/0205135 A1 Jul. 4, 2019

(51) Int. Cl.
*G06F 9/30* (2018.01)
*G06F 13/16* (2006.01)
*G06F 9/38* (2018.01)

(52) U.S. Cl.
CPC ........ *G06F 9/30047* (2013.01); *G06F 9/3814* (2013.01); *G06F 13/1673* (2013.01); *G06F 2213/0064* (2013.01)

(58) Field of Classification Search
None
See application file for complete search history.

(56) References Cited

U.S. PATENT DOCUMENTS

| | | | |
|---|---|---|---|
| 2004/0163083 A1* | 8/2004 | Wang ................... | G06F 9/3009 718/102 |
| 2005/0081014 A1* | 4/2005 | Tran .................... | G06F 12/0215 711/213 |
| 2006/0041722 A1* | 2/2006 | Hakura ............... | G06F 12/0862 711/137 |
| 2006/0041723 A1* | 2/2006 | Hakura ............... | G06F 12/0862 711/137 |
| 2017/0322885 A1* | 11/2017 | Mukherjee .......... | G06F 12/0862 |
| 2018/0173631 A1* | 6/2018 | Sartorius ........... | G06F 16/24558 |

* cited by examiner

*Primary Examiner* — Corey S Faherty
(74) *Attorney, Agent, or Firm* — Nicholson De Vos Webster & Elliott LLP

(57) ABSTRACT

Implementations of the disclosure implement timely and context triggered (TACT) prefetching that targets particular load IPs in a program contributing to a threshold amount of the long latency accesses. A processing device comprising an execution unit; and a prefetcher circuit communicably coupled to the execution unit is provided. The prefetcher circuit is to detect a memory request for a target instruction pointer (IP) in a program to be executed by the execution unit. A trigger IP is identified to initiate a prefetch operation of memory data for the target IP. Thereupon, an association is determined between memory addresses of the trigger IP and the target IP. The association comprising a series of offsets representing a path between the trigger IP and an instance of the target IP in memory. Based on the association, an offset from the memory address of the trigger IP to prefetch the memory data is produced.

20 Claims, 14 Drawing Sheets

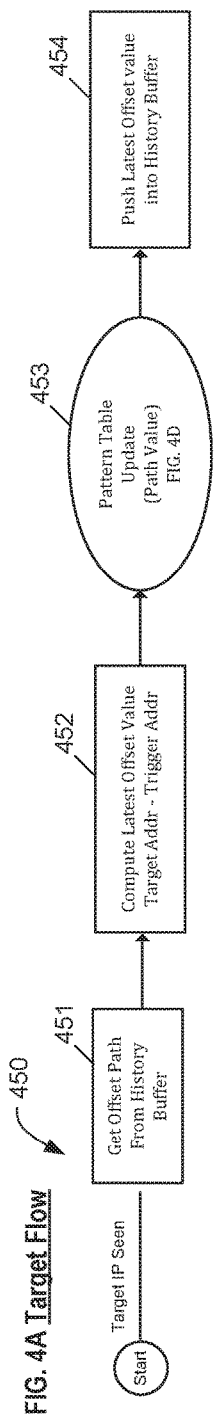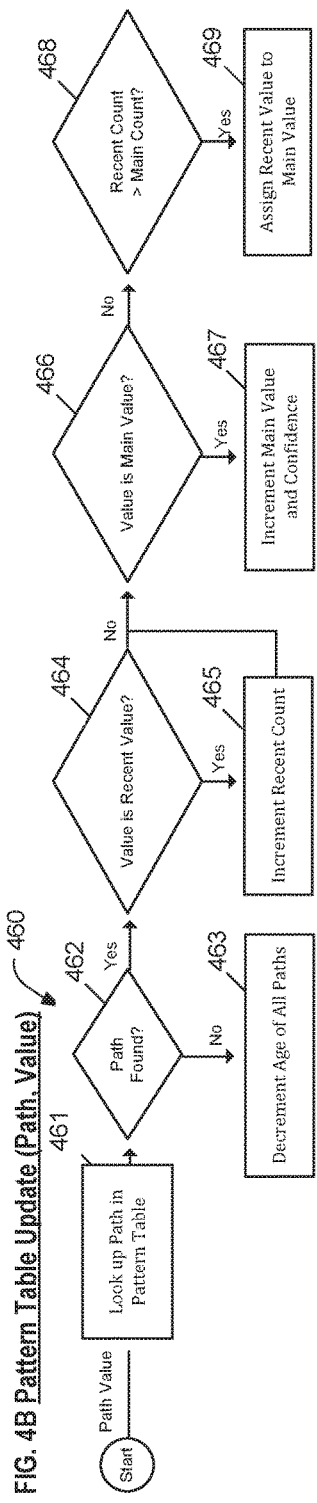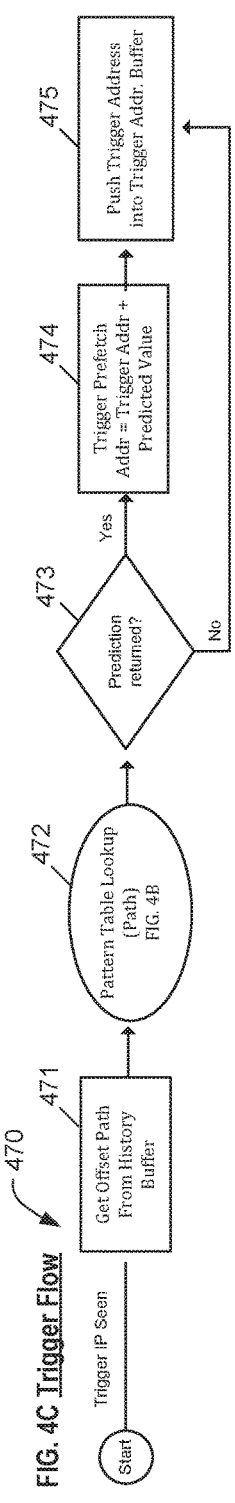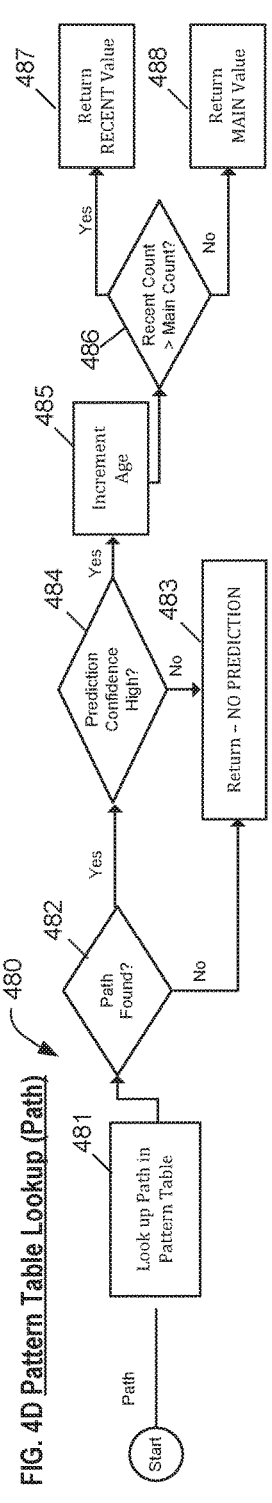
FIG. 4A Target Flow
FIG. 4B Pattern Table Update (Path, Value)
FIG. 4C Trigger Flow
FIG. 4D Pattern Table Lookup (Path)

SUPPORTING TIMELY AND CONTEXT TRIGGERED PREFETCHING IN MICROPROCESSORS

TECHNICAL FIELD

Embodiments of the disclosure relate generally to microprocessors and more specifically, but without limitation, to supporting timely and context triggered prefetching in microprocessors.

BACKGROUND

As computing systems are getting faster, the speed gap between processors and the main memory system increases. Moreover, as many main memory systems are external to the processor, considerable delay is incurred from the time the processor requests data from main memory until the processor receives the first piece of that information so that it can continue computing.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4A-4D illustrates flow diagrams of methods for training to support timely and context triggered prefetching in microprocessors according to an embodiment of the disclosure.

DETAILED DESCRIPTION

Figure 1:
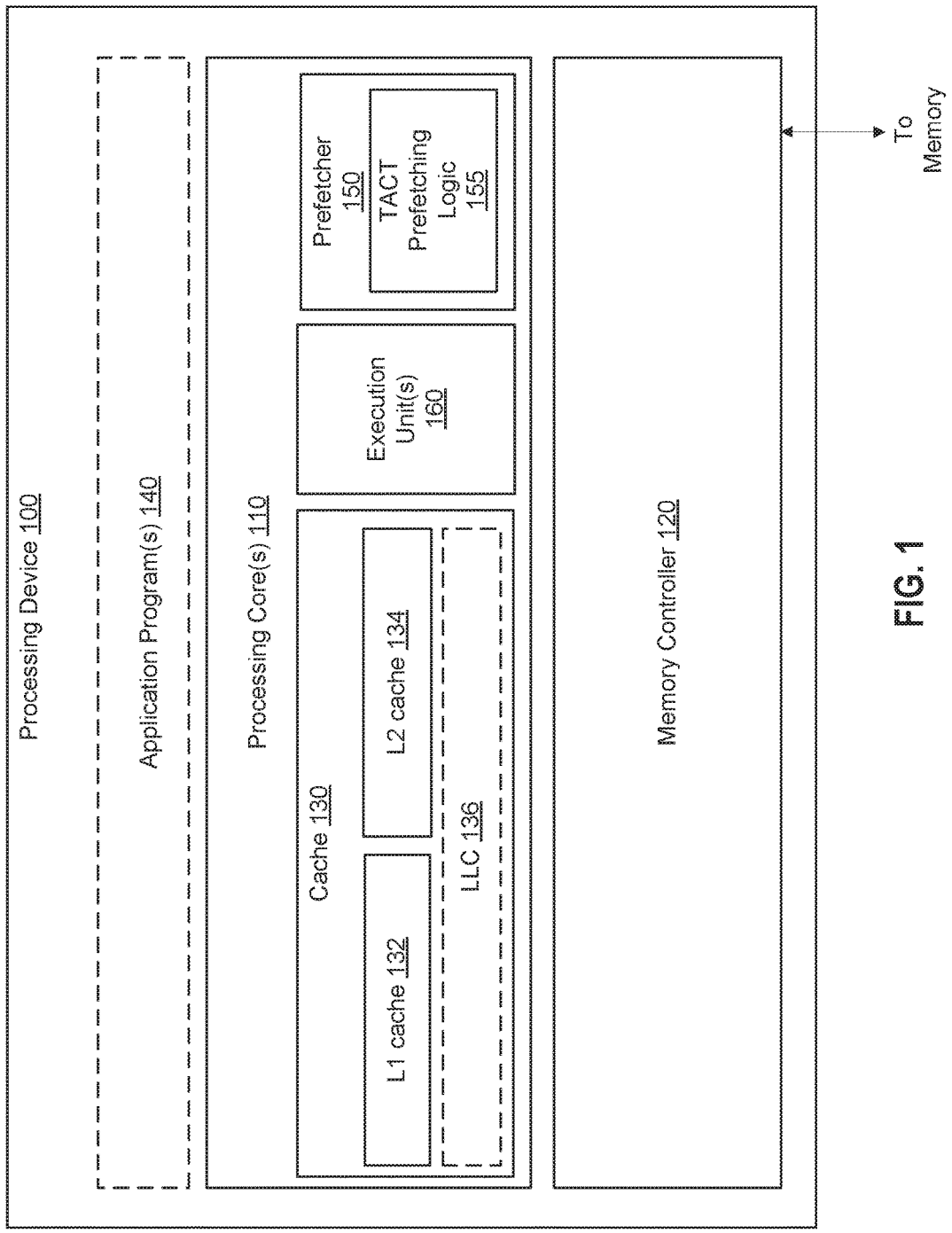
FIG. 1 illustrates a block diagram of a processing device for supporting timely and context triggered prefetching in microprocessors according to embodiments of the disclosure.

Implementations of the disclosure describe supporting timely and context triggered prefetching in microprocessors. Instructions and data that are to be utilized by a processor of a computing system may be stored on a fixed disk medium. Once a request is made to execute a program, the program code associated with the program is loaded into the computing system's memory, which may include one or more dynamic random access memory (DRAM) devices. The processor then executes the program code by fetching an instruction from the system memory, receiving the instruction over a system bus, performing the function dictated by the instruction, fetching the next instruction, and so on. The data that is operated on by these instructions is also fetched by the processor from system memory.

Whenever the system memory is accessed, there is a potential for delay between the time the request to memory is made (either to read or write data) and the time when the memory access is completed. This delay is referred to as "latency" and can limit the performance of the computer. There are many sources of latency. For example, operational constraints with respect to DRAM devices cause latency. Specifically, the speed of memory circuits is typically based upon two timing parameters. The first timing parameter is memory access time, which is the minimum time for the memory circuit to set up a memory address and produce or capture data on or from the data bus. The second timing parameter is memory cycle time, which is a minimum time that occurs between two consecutive accesses to a memory circuit.

Prefetching, in many situations, can used to hide memory latency in computer systems. Prefetching is a technique by which the processor anticipates or otherwise predicts future data accesses and brings the data from system memory into a fast buffer (e.g., in a level-one (L1) or level-two (L2) cache) before the executing program references the data. In that regard, instructions and data can be prefetched from long-latency memory devices (e.g., main memory or external memory devices) to short-latency memory devices (e.g., the L1/L2 cache memory devices that reside on a microprocessor). Because of this prefetching, the instructions and data used by the processor are made readily available from the fast memory devices that are closer to execution units of the processor.

Some prefetching techniques, such as stride prefetching, stream buffering, spatial memory streamer (SMS), access map pattern matching (AMPM), variable length delta prefetching (VLDP), signature path prefetching (SPP), best offset prefetching (BOP) and the like, make system tradeoffs between resource complexity, timely coverage and accuracy and therefore may be suboptimal for performance or power. In one situation, stride prefetching uses instruction pointers as a program marker to predict and avoid future memory caches misses when executing the program. An instruction pointer (IP) refers to a memory location of a particular instance of an instruction in the program. Stride based prefetching is premised on the theory that an instruction accesses a series of memory locations that are the same distance apart from one another. If a memory address is missed, an address that is offset by a distance from the missed address is likely to be missed in the near future. As such, the stride prefetching performs predictions for a large number of IPs by doing a simple stride of a fixed distance, e.g., one instruction, from a particular IP marker in the program to a prefetch address. However, the fixed distance of the stride prefetching is rarely sufficient for saving significant portions of memory latency, particularly in cases with complex memory access patterns. In such cases, if the stride prefetching does not help in reducing memory latency, it can have a negative impact with respect to power management of the system to implement this prefetching technique.

Some other prefetching techniques use adjacent cache line prefetching based on memory accesses filtered by L1 cache load hits, e.g., at L2 cache or beyond. Typically, it is very expensive to pass virtual address information for an IP beyond L1. Therefore, these prefetching techniques operate on physical addresses. This affects both the accuracy of these prefetching techniques (more entropy in address streams due to L1 filtering) and their timeliness (limited to prefetching within a certain page boundary). In many cases, prefetching techniques mainly succeed in partially hiding some portion of memory latency. For example, stream buffering techniques are generally highly inaccurate since these stream buffering techniques look for a directional trend of accesses in a page and perform degree (e.g., a number of requests issued by the prefetcher on each instance of it being triggered) 2 or higher prefetching in which a larger degree may have larger coverage but lower accuracy. This increases power, cache pollution, and can adversely affect performance in memory limited scenarios. SMS/AMPM prefetching techniques lack temporal information which can affect their "timeliness," which is a measure of how much latency is saved by the prefetcher. VLPD/SPP/BOP prefetching techniques incorporate the temporal order of requests to increase the "prefetch distance" of the predictions. The prefetch distance is associated with the timeliness of the prefetcher and depends on how far ahead in the program access stream are the prefetcher fetching addresses. However, the increase in prefetch distance results from recursively traversing a data structure such as a linked list, tree, and a graph representing the IPs in the program, which is limited, or a compression of a limited series of offsets.

Embodiments of the disclosure address the above-mentioned and other deficiencies by providing techniques to implement timely and context triggered (TACT) prefetching. The TACT prefetching can dynamically (e.g., during runtime, etc) learn and target particular load IPs in a program that contribute to a threshold amount of the long latency accesses (and are hence the primary bottleneck to performance) in the system. The techniques of the disclosure may implement prefetching hardware and/or TACT prefetching logic (e.g., circuitry, dedicated logic, programmable logic, microcode, etc.) to provide the benefits described herein. In one embodiment, the techniques disclosed herein are embedded in a combination of hardware circuitry and software of a processor implementing the TACT prefetching logic. In an alternative embodiment, the techniques disclosed herein are incorporated into a dedicated hardware device (e.g., a prefetcher circuit). In some embodiments, the hardware device can be within the processor, or it can be on a separate device from the processor. In other embodiments, the hardware device can include some logic or instructions that are outside of the processor. The instructions implement TACT prefetching logic to allow the hardware device to be an efficient prefetcher with its resources directed towards solving the main long latency bottlenecks in the system.

In operation, the TACT prefetching logic targets prefetching for specific long latency IPs (LLIPs) in a program. The LLIPs, for example, contribute to most of the memory stalls in the processor, such as up to 32 LLIPs contributing to a certain threshold amount (e.g., 90%) of the long latencies. The TACT logic can identify a trigger IP that is used to initiate a prefetching memory access prediction for each of the target IPs. For example, the trigger IP is a recorded address of a memory access from program that is used as an indicator of the prefetching target IP. Thereupon, TACT issues timely (long distance) prefetches for these target IPs by actively determining patterns for long prefetch distances (deep associations) between the addresses of the triggers and their respective prefetch target IPs. When an instance of the trigger IP is observed by the system during an execution of the program, a prefetch operation for data of a certain offset distance from the trigger IP is issued for the target IP. For example, an offset distance of 1 prefetch is when the next immediate instance of the target IP is prefetched. An offset distance of "N" prefetch is when the "N th" instance of the target IP is prefetched. As such, the higher distance from the trigger IP to the target IP correlates to the more timeliness (which is a measure of how much latency is saved by the prefetcher) of the prefetches.

Embodiments of the disclosure are advantageous for finding and accelerating those load IPs that contribute the most to processor stalls due to their long latency accesses from main memory. These advantages are built into TACT's design by virtue of it searching for patterns for long prefetch distance ("deep" associations), which helps in scenarios when memory resources are constrained. Moreover, the various techniques and parameters disclosed within may be further scaled to provide additional benefits. For example, the TACT prefetching logic adds a number of additional micro-architectural optimization techniques that help overcome challenges posed by prefetching at long distances using virtual addresses.

In one example, TACT logic implements staged prefetching with distance 32 prefetches filling L2 caches (and L3 if it exists) and distance 4 prefetches filling into the level 1 cache. In that regard, the closer the instance of the target IP is prefetched, the higher the likelihood of retaining it in L1 before its use. In another example, if a small 8 entry TLB cache is used by TACT, this helps significantly relieve the pressure in the main TLB by reducing the amount of TACT prefetches to go through the main TLB for their virtual address to physical address translation. In yet another example, TACT logic may be configured to dynamically identify specific instances of the target LLIPs that have long latency and perform a second update to a pattern table when the target instance has long latency. In that regard, TACT prefetches are issued for these long latency paths. With this optimization, there is a reduction in the prefetches issued by TACT logic with a negligible impact on TACT performance, which additional reduces pressure on the cache resources.

FIG. 1 illustrates a block diagram of a processing device 100 for supporting timely and context triggered prefetching in microprocessors according to one embodiment. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 includes one or more processors cores 110 and a memory controller unit 120, one or more execution units 108, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 is used in a system on a chip (SoC) system. In one embodiment, the SoC can comprise processing device 100 and a memory. The memory for one such system is a DRAM memory. The DRAM memory can be located on the same chip as the processor and other system components. Additionally, other logic blocks such as a memory controller or graphics controller can also be located on the chip.

The execution units 160 in conjunction with the processor core(s) 110 may execute instructions for the processing device 100. For example, the processing cores 110 are adapted to forward an instruction to the execution unit 160 for execution. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller 120 may perform functions that enable the processing device 100 to access and communicate with memory (not shown) that includes a volatile memory and/or a non-volatile memory. In some embodiments, the memory controller 120 is located on a processor die associated with processing device 100, while the memory is located off the processor die. In some embodiments, the processing device 100 includes a cache memory 130 to cache instructions and/or data. The cache memory 130 includes, but is not limited to, a level one (L1) 132, level two (L2) 134, or any other configuration of the cache memory within the processing device 100. In some embodiments, the processing device 100 includes, a last level cache (LLC) 136 that is shared by multiple processing cores 110 of processing device 100, and consequently threads executing on each of these cores, or local/dedicated/private to single core of a processor (e.g., not shared). In some embodiments, the L1 cache 132 and L2 cache 134 can transfer data to and from the LLC 136. In one embodiment, the memory controller 120 can be connected to the LLC 136 to transfer data between the cache memory 130 and memory. As shown, the cache memory 130 can be integrated into the processing cores 110. The cache memory 130 may store data including instructions that are utilized by one or more components of the processing device 100.

In some embodiments, the processing device 100 executes one or more application programs 140 (e.g., a user-level multithreaded application). Such application programs 140 may be executed by system software (not shown) installed at the processing device 100. Examples of system software include, but are not limited to, one or more operating systems, a virtual machine monitor (VMM), a hypervisor, and the like, and combinations thereof. The application programs 140 may use instructions (e.g., branch instructions 160) to control the processing device 100 as disclosed herein. The instructions may represent macroinstructions, assembly language instructions, or machine-level instructions that are provided to the processing core 110 for execution.

During the execution of an application program 140, the processing device 100 generates memory requests (e.g., load operations) when program instructions or data are required. The memory request is tied to an address or group of addresses in the main memory. To increase efficiency, recently used instructions or data are stored in the cache memory 130, which is much faster than the external main memory. Many computer programs repeatedly access large data structures, generating the same (or similar) sequence of data references. Sequential memory requests are typically related temporally (due to program loops) and spatially (due to the requests for adjacent memory cell values). Because overhead for accessing the main memory is large, the benefits of caching additional data are significant. If the requested data or instruction is found in the cache memory 130 (e.g., cache hit), the requested data or instruction is retrieved from the cache memory to be executed. If the requested data or instruction is not found in the cache memory (e.g., cache miss), the memory read request is sent to the memory controller 120 for servicing from the main memory.

One way of increasing the likelihood of a cache hit is to prefetch data for certain load instructions earlier than it would otherwise be fetched. Prefetching is a technique by which the processing device 100 anticipates or otherwise predicts future data accesses and brings that data from main memory into a fast buffer (e.g., the cache memory 130) before the executing application program 140 references the data. In that regard, the processing device 100 comprises a prefetcher 150 also referred to as a prefetcher circuit to implement TACT prefetching logic 155. In some embodiments, the prefetcher 150 is implemented as part of the processing device 100. In alternative embodiments, the prefetcher 150 is implemented in a separate hardware/software component, circuitry, dedicated logic, programmable logic, microcode of the processing device 100 or any combination thereof. In some embodiments, the prefetcher 150 includes a dedicated portion of the same processor logic and circuits executed by the processing cores 110. For example, the prefetcher 150 may include TACT prefetching logic 155 to prefetch data for specific long latency loads in the application programs 140 that, for example, contribute to a certain threshold amount (e.g., 90%) of the long latencies related to an amount of time it takes to retrieve data from the main memory. As discussed herein, "logic" may refer to hardware (e.g., circuitry, dedicated logic, programmable logic, microcode, etc.), software (such as instructions run on a processing device), firmware, or any combination thereof.

Figure 2A:
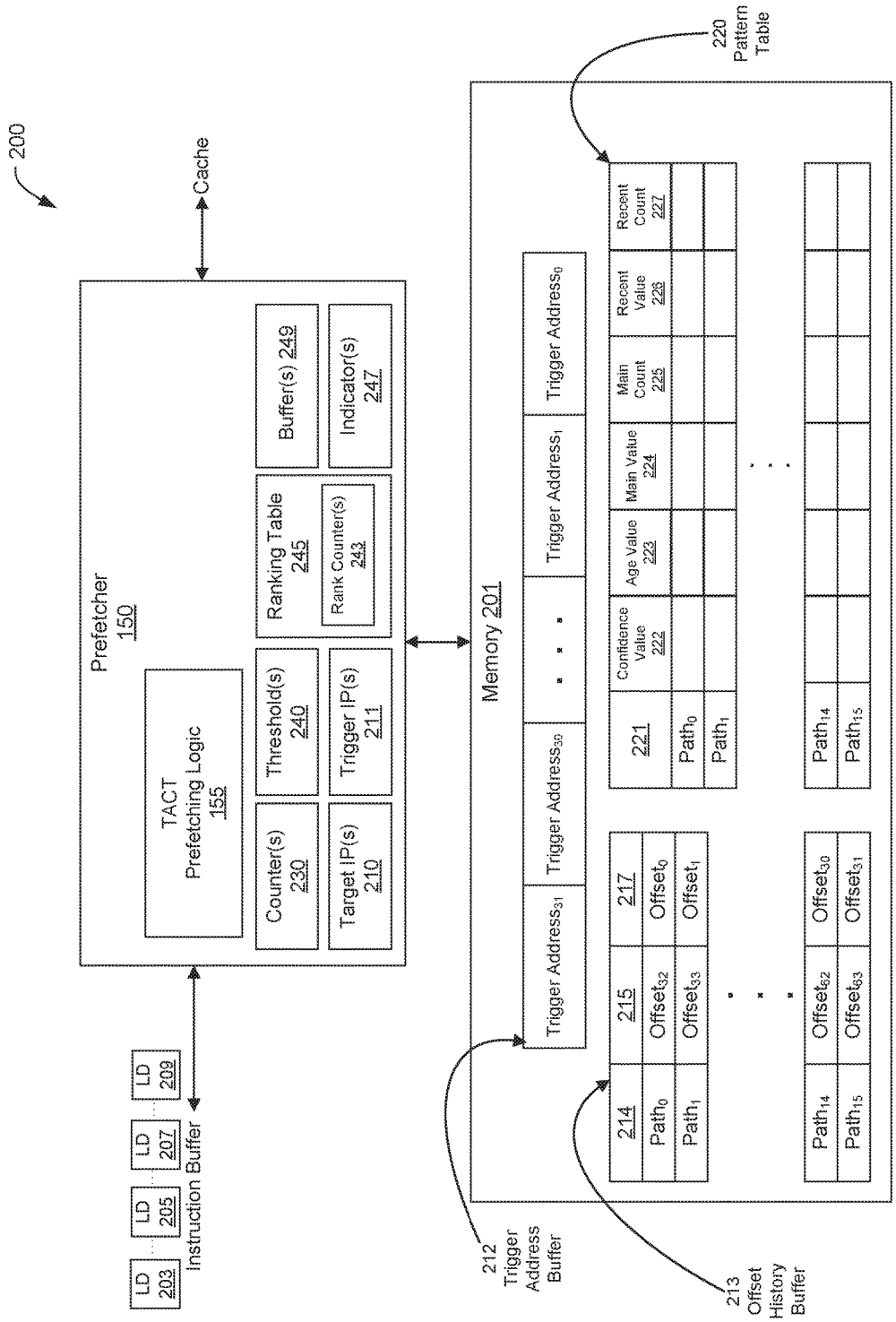
FIG. 2A illustrates a block diagram of a system including a memory to support timely and context triggered prefetching in microprocessors according to embodiments of the disclosure.

FIG. 2A illustrates a block diagram of a system 200 including a memory 201 to support timely and context triggered prefetching in microprocessors. In this example, system 200 may be the same or similar to processing device 100. For example, system 200 includes the prefetcher 150 of processing device 100 of FIG. 1, which implements TACT prefetching logic 155 to prefetch data for particular load instructions 203, 205, 207 and 209 in a program, such as application program 140. To prefetch the data, the prefetcher 150 receives a plurality of instruction pointers, where each IP indicates a memory location containing an instruction, such as load instructions 203, 205, 207 and 209. For example, an instruction buffer (not shown) of system 200 receives and stores IPs of the instructions 203, 205, 207 and 209 to be fetched from main memory. In some embodiments, the TACT prefetching logic 155 directs the prefetcher 150 to "target" prefetching for certain target IPs of the instructions 203, 205, 207 and 209 that contribute to a threshold amount of the long latency memory accesses in the system 200, and then store the prefetched data in cache memory, such as cache memory 130 of FIG. 1. In that regard, the prefetcher 150 includes, but is not limited to, various counters 230 and threshold values 240, ranking tables 245, indicators 247 and buffers 249 that may be implemented in hardware (e.g., registers/memory 201) or software of system 200 to support operations of the TACT prefetching logic 155 for prefetching of data for the target IPs 210.

Memory 201 may include any non-persistent data storage, persistent and/or volatile data storage (e.g., flash storage, hard drive, tape), other medium, or combination thereof that is capable of storing instructions and/or data structures 212, 213, 220 for carrying out the operations of the system 200 as discussed herein. Each of the data structures 212, 213, 220 may be a table, array, or other types of similar data structures comprising a plurality of entries for storing data. In some embodiments, the data structures includes, for example, a trigger address buffer 212 that stores a certain number (e.g., the last 32) of trigger addresses for the trigger IPs 211 used to trigger a prefetch for a corresponding target IP 210, an offset history buffer 213 to store a plurality of paths 214 comprising offset values 215, 217 from a memory address of a target IP 210 to the memory address of a trigger IP 211, and a pattern table 220 that stores the most frequently occurring, high confidence paths 221 for a trigger IP 210 and target IP 211 pair. For example, each entry or row of the pattern table 220 is indexed by an identifier 214 for a particular path 221. Each row stores values per path that include a confidence value 222, an age 223, an main value 224 of the most frequently occurring offset for this path, a main count 225, a recent value 226 of the last seen offset for this path, and a recent count 227 associated with the particular path 221 for the row.

In operation, the prefetcher 150, using the TACT prefetching logic 155 and the data structures 212, 213, 220 of memory 201, implements several techniques to issue TACT prefetching for particular load IPs in a program, such as application program 140. These TACT prefetching logic 155 techniques may include, but are not limited to, detecting a prefetching target IP 210, such as specific long latency IPs (LLIPs) in a program that, for example, contribute to a threshold amount 240 of the memory latency in the system 200, identifying a trigger IP 211 that is used to initiate a prefetching memory access prediction for the target IP 211, and determining patterns for triggering long prefetch distances (deep associations) between the memory addresses of the trigger IP 210 and the target IP 210. For example, when an instance of the trigger IP 211 is observed by the prefetcher 150 during an execution of the program, the prefetcher 150 may issue (e.g., based on the determined patterns) a prefetch of data of a certain offset distance from the trigger IP 211 for the target IP 210. Aspects of the TACT prefetching logic 155 techniques are further discussed below.

The following methods may be performed by processing logic that may comprise hardware (e.g., circuitry, dedicated logic, programmable logic, microcode, etc.), software (such as instructions run on a processing device), firmware, or a combination thereof. In one embodiment, the prefetcher 150 as directed by the TACT prefetching logic 155 of processing device 100 in FIG. 1 can perform the methods. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, other process flows are possible.

FIGS. 2B-2E illustrates flow diagrams of methods 250, 260, 270 and 280 for detecting a target IP for supporting TACT prefetching in microprocessors, for example, using system 200. In these examples, the TACT prefetching logic 155 of the prefetcher 150 may use various counters 230, threshold values 240 and other types of data structures of system 200 of FIG. 2A to detect that one or more loads (long latency instruction pointers) LLIPs in a program are a prefetching target IP 210.

In one embodiment, the TACT prefetching logic 155 uses a certain cycle (e.g., 60) latency threshold value (e.g., one of the thresholds 240 of FIG. 2) to mark a particular load instruction in the program as a long latency candidate. For example, FIG. 2A depicts a method 250 as using a "Gong" counter, such as one of the counters 230, which sends out an alert or signal to the load buffer (LB) entries in a processor. The load buffer stores a queue of load instruction IPs to be executed by the processor. The Gong counter of method 250 is initialized to a value ("0") when the load IP is inserted in the LB.

Figure 2C:
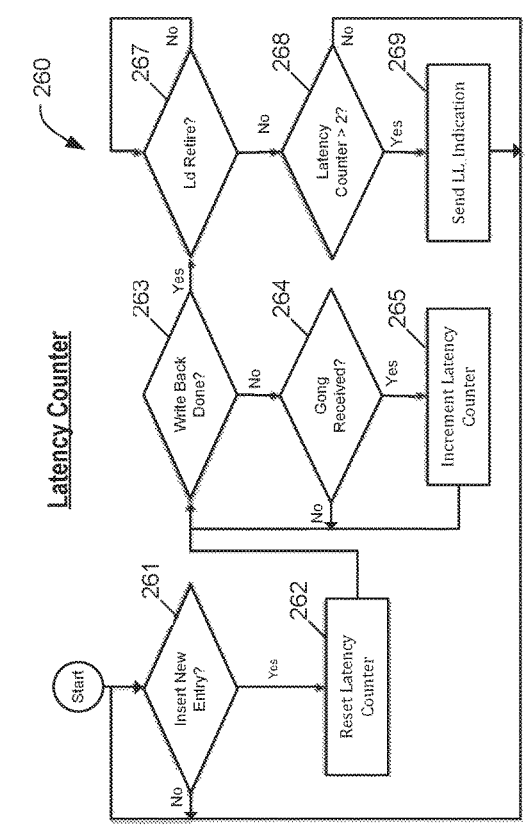
FIGS. 2B-2E illustrates flow diagrams of methods for detecting a target instruction pointer for supporting timely and context triggered prefetching in microprocessors according to an embodiment of the disclosure.
Figure 2E:
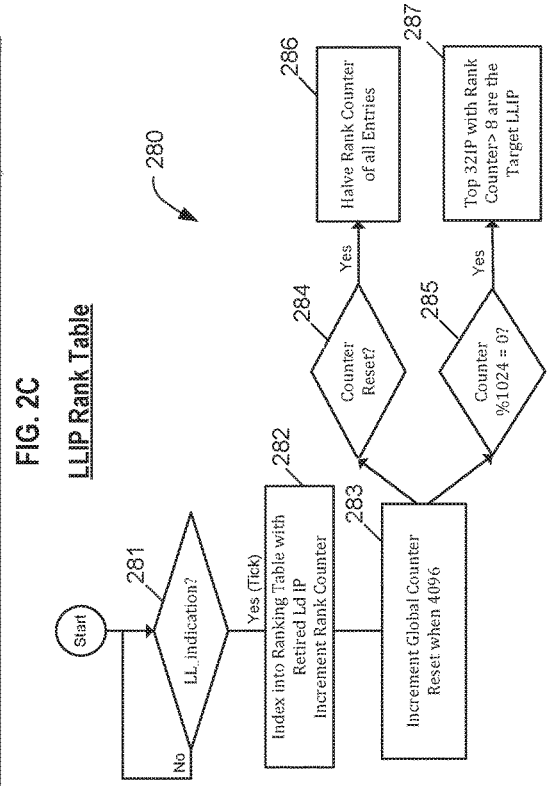
Figure 2B:
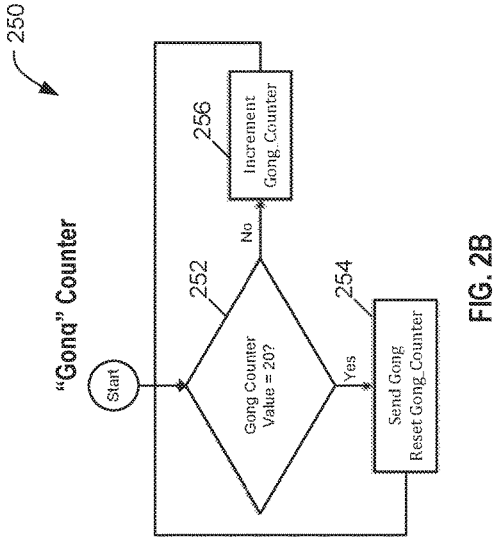

With regards to FIG. 2B, if the Gong counter satisfies the threshold value at block 252, method 250 proceeds to block 254 where a signal is generated and the counter is reset (e.g., to a value of 0). Otherwise, method 250 proceeds to block 256 where the Gong counter is incremented. The Gong counter is used to signal when a predetermined number of cycles have passed since the load IP was inserted in the LB.

FIG. 2C depicts a method 260 as using a "Latency" counter, such as one of the counters 230, associated with the prefetcher 150. The Latency counter is added by the prefetcher 150 to every LB in the system 200. With regards to FIG. 2C, if a new entry is inserted in the LB at block 261, method 260 proceed to block 262 to reset the Latency counter, and then method 260 proceeds to block 263. If the new entry has completed a load (write back) of the data to cache in block 263, method 260 proceeds to block 264 to determine whether a signal has been received based on the Gong counter, such as the Gong counter described with respect to FIG. 2B. If the signal is received in block 264, method 260 proceeds to block 265 to increment the Latency counter, otherwise it proceeds back to block 263 to waiting for the new entry to load the data from main memory to cache.

When the load is completed, method 260 proceeds to block 267 to determine whether the new entry is retired by the system 200. If the new entry is retired, method 260 proceeds to block 268 to check the value of the Latency counter. If the value of the counter is greater than a certain value (e.g. 2), method 260 proceeds to block 269 to send a long latency indicator 247 or other types of signals (e.g., LL_indication) indicating that load instruction is a long latency candidate. For example, this flag may indicate that the load instructions took at least a threshold amount latency 230 (e.g., 60 cycles) to load data back into the cache.

Figure 2D:
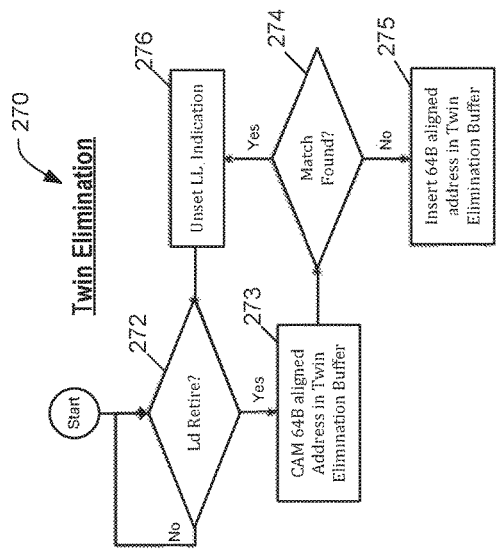

In some embodiments, the TACT prefetching logic 155 can eliminate certain "twin" load instructions as possible long latency candidates. For example, twin load instructions may refer to multiple load IPs that may access different bytes in the same line (e.g., 64 KB) of a cache. The IPs can be considered as "twins" and the first IP to access the line of bytes is to be considered as a long latency candidate. In FIG. 2D, method 270 uses an 8 entry twin elimination buffer used by the TACT prefetching logic 155 to store 64B aligned addresses of loads retired by system 200. The transmission of long latency indicator 247 (e.g., LL_indication) indicating that the load is a long latency candidate is dependent upon a lookup into the twin elimination buffer 249.

With regards to FIG. 2D, if the load is retired and is a possible long latency candidate in block 272, method 270 proceeds to block 273 to insert the address of the load into the twin elimination buffer 249. If a match for the load is not found in the twin elimination buffer 249 in block 274, method proceeds to block 275 and the address of the load is inserted into the twin elimination buffer. If a match for the load is found in the twin elimination buffer 249 in block 274, method proceeds to block 276 where the long latency flag is unset for the twin load instruction.

In some embodiments, the TACT prefetching logic 155 can store, for example, in a ranking table 245 comprises "rank" counters 243 (e.g., 12-bit counters) for each of the long latency IPs. The rank counter 243 may be used to select a certain amount of the top ranking long latency candidates as the target IPs 210. In this regard, the rank counter 243 indicates a count of an amount of times a particular IP is marked as a long latency candidate where data loaded by the IP is served from main memory at the threshold amount latency 240 (e.g., 60 cycles). In this regard, the rank counter 243 of an IP in the ranking table is incremented on a "tick" (e.g., a value of the LL_indication) to that table indicating that a long latency indicator 247 (e.g., LL_indication) was generated for the IP during an execution of the program.

With regards to FIG. 2E, if a long latency signal is detected for the IP in block 281, method 280 proceeds to block 282 to index the ranking table 245 with the retired loads IP and increment the ranking counter 243 for that IP. In block 283, method 280 increments a global counter that is reset when it reaches a certain value (e.g., 4096). If the global counter 230 is reset in block 284, method 280 proceeds to block 286 where the rank counter of every IP in the ranking table is halved to keep the rank information from going stale. If the global counter 230 satisfies a certain value in block 285, method 280 proceeds to block 287 where a top number (e.g., 32) of IP with a rank counter 243 greater than a certain value (e.g., 8) are selected as the Target IPs 210 (e.g., LLIPs in a program) for prefetching data.

Figure 3A:
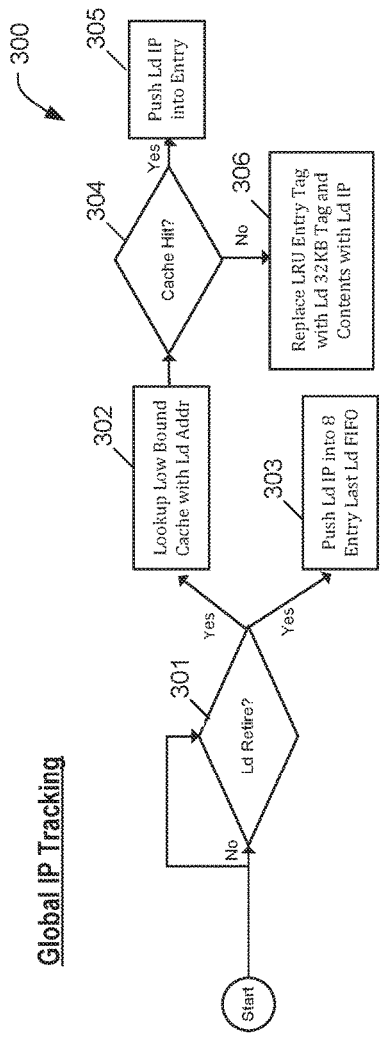
FIGS. 3A-3B illustrates flow diagrams of methods for identifying a trigger instruction pointer for supporting timely and context triggered prefetching in microprocessors according to an embodiment of the disclosure.
Figure 3B:
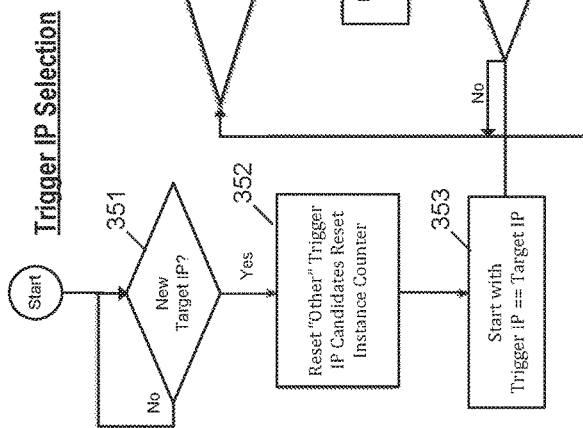

FIGS. 3A-3B illustrates flow diagrams of methods 300 and 350 for identifying a trigger instruction pointer, such as the identification of Trigger IPs 210 for long latency Target IPs 211, for supporting TACT prefetching in microprocessors, for example, using system 200. In these examples, the TACT prefetching logic 155 of the prefetcher 150 may use various counters 230, threshold values 240 and other types of data structures of system 200 to identify a trigger IP 211 in a program to initiate a prefetch operation of data from main memory for the target IP 210.

In some embodiments, the TACT prefetching logic 155 tracks address region (e.g., 32 KB) of the cache memory 130 touched by IPs of the program to identify the trigger IP 211 for a particular target IP 210. With regards to FIG. 3A, to identify the region of the cache memory 130, method 300 determines whether a load instruction is retired by system 200 in block 301. On a load retire, the load IP is pushed into the 8 entry first-in-first-out (FIFO) buffer and the load IP is updated in the low bound cache. The cache is organized as a set-associative cache. For example, if a cache with 64 elements is organized as an 8 set 8 way associative cache, this means that there are 8 sets, each set has 8 ways. The cache is indexed/accessed using the address access by the IP. For example, it is indexed using the 32 KB address region accessed by the IP. The address accessed by an IP is a byte address. To get the 32 KB address region accessed by the IP, the least significant 15 bits (left shift by 15) are removed. In embodiments, the 32 KB aligned address is mapped into an entry in the cache. Because there are 8 (2 to the power 3-2^3) sets, the least significant 3 bits of the 32 KB address determines which set (0 to 7) the address maps to. The address can map to any of the 8 ways in this set. A cache hit is when the address is found in one of these 8 ways. On a cache miss, the least recently used way is replaced with this address.

Turning back to FIG. 3.A, if a load instruction is retired, method 300 proceeds to block 302 to look up a low bound cache address in cache memory 130 with the memory address of the load instruction. The load IP of the load instruction is also pushed into a last entry of a FIFO trigger address buffer 212. In block 304, if the lookup results in a cache hit, method 300 proceeds to block 305 to push the load IP into an entry of the trigger address buffer 212. Otherwise, method 300 proceeds to block 306 to replace a tag of the least recently used (LRU) entry in the trigger address buffer 212 with a (32 KB) tag associated with the load IP and the LRU entry with contents of the load IP as a probable trigger IP 211.

FIG. 3B depicts a method 350 of FIG. 3B depicts a method 350 of identifying Trigger IP 210 candidates for each long latency Target IP 211 by building a candidate list of candidate Trigger IPs for each Target IP. The candidate list starts with a SELF association or in other words a SELF Trigger where the long latency Target IP 211 is itself a beginning candidate for the Trigger. Method 350 may determine additional trigger candidates in several ways, such as the 4 IPs stored in the "low bound cache" (e.g., these are the IPs that access the same 32 KB address region as the Target IP), and the 8 IPs stored in the FIFO buffer from FIG. 3A. Since the candidate triggers cannot be used simultaneously, method 350 examines each candidate trigger one at a time to determine the trigger that has an address correlation to the target IP. This is the address correlation that is used for prefetching data for the target IP as further discussed below.

In block 351, if a new target IP is detected, method 350 proceeds to block 352 where a counter (e.g., one of the counters 230) for counting the number other trigger IP candidate is reset. In block 353, the candidate list starts with a SELF association where the long latency Target IP 211 is itself a beginning candidate for the trigger. In block 354, method 350 tracks a certain number of (e.g., 32) candidate trigger IPs to add to the candidate list. If the number of candidates in the list is not stratified, method 350 proceeds to block 355 where it is determined whether the target IP is dispatched by the processing core. If the target IP is dispatched, method 350 proceeds to block 355-A, where candidate IPs from the low bound cache and the 8 entry last LD FIFO are read. The candidates are matched against entries (e.g., 4) in the candidate list and the counter is incremented in block 356. The IPs that repeatedly occur in the low bound or last in the IP list stay as probable trigger IP candidates. In that regard, the trigger IPs least frequently used may be replaced in the list.

In block 354, if a certain number of (e.g., 32) candidates are counted, method 350 proceeds to block 357 where the counter is reset. In block 358, the addresses across 32 instances of the candidate and trigger IP, target IP pairs are compared to identify repeating/stable/high confidence delta or offsets between the Trigger IP and Target IP addresses. For example, the confidence level can be tracked using (e.g., a 3-bit) counter that is incremented for every instance of the same delta or offsets being observed between the addresses. For every instance of the delta being different from the previous delta, the counter is decremented. In some examples, a counter greater than or equal to a value (e.g. of 5 out of max 7 in a 3 bit counter) may be considered as high confidence. In block 359, if after 32 instances of trigger and target IPs are compared and a high confidence association is not determined, method 350 moves to the next Trigger candidate in the candidate list.

FIG. 4A-4D illustrates flow diagrams of methods 450, 460, 470 and 480 for training to support TACT prefetching in microprocessors, for example, using system 400. In these examples, the TACT prefetching logic 155 of the prefetcher 150 may use various counters 230, threshold values 240 and other types of data structures of system 200 to identify a trigger IP 211 in a program to determine path patterns for triggering long prefetch distances (deep associations) between the memory addresses of the trigger IP 210 and the target IP 210.

Method 450 depicts an example of technique to train the prefetcher 150 to identify and predict path patterns that occur when a target IP 210 instance is issued by a processor, such as processing device 100. With regards to FIG. 4A, when the prefetcher 150 detects the target IP 210, method 450 proceeds to block 451 where an offset path 214 from the trigger IP 211 to the target IP 210 is retrieved from the offset history buffer 213. For example, the offset path 214 is identified from the offset history buffer 213 based on the identifiers 215, 217 of the trigger IP 211 and the target IP 210 in the offset history buffer 213. In block 452, the latest offset value is computed as the memory address of the target IP 210 minus the memory address of the trigger IP 211. In block 453, pattern table 220 of FIG. 2 is updated based on the path and the latest offset value associated with the trigger IP 211 and the target IP 210 pair. For example, method 460 of FIG. 4B depicts a method of updating the pattern table 220. Thereupon, the latest offset value is pushed in the offset history buffer 213 in block 454.

With regards to FIG. 4B, method 460 looks up the path in the pattern table 220 in block 461. In block 462, if the path is not found in the path field 221 of the pattern table 220, method 460 proceeds to block 463 where the age field 223 of all paths in the pattern table 220 is decremented. If the path is found, the latest offset value is compared to the recent value field 226 in block 464. If the latest offset value matches the recent value field 226, the recent count field 227 is incremented in block 465. If the values do not match, the latest offset value is compared to the main value field 224 in block 466. If the latest offset value matches the main value field 224, the main value count field 225 and the confidence value field 222 are incremented in block 465. In block 468, if the recent count field 227 of the pattern table 220 is greater than the main count field 224, method 460 proceeds to block 469 to assign the recent value to the main value.

FIG. 4C depicts a method 470 of triggering a prefetch of data for a target IP upon the prefetcher 150 detecting the target's trigger IP 211 in an execution of a program. Method 470 begin in block 471 where an offset path 214 is retrieve from the offset history buffer 213 based on an identifier for the trigger IP 221. In block 472, the path is identified in the pattern table 220 to determine a predicted offset value to prefetch data. For example, method 470 of FIG. 4D depicts a method of determining a predicted offset value for a particular path pattern stored in the pattern table 220. If the predict offset value for the path is determined, method 470 proceeds to block 474 where a prefetch address for the trigger IP 211 is computed based on the memory address of the trigger IP 222 and the predicted offset value. For example, the prefetch address is the trigger IP address added to the predicted offset value from the pattern table 220. Finally, the trigger address buffer 212 is updated with the latest address of the trigger IP 211 in block 475.

With regards to FIG. 4D, method 470 depicts a technique for looking up the pattern table 220 for a prediction. In block 481, method 470 determines whether the path is in the pattern table 220. If the path is not found in block 482, method 470 generates a no prediction signal in block 483. If the path is found in the pattern table 220, method 470 proceeds to block 484 where the prefetcher 150 determines whether the path has a high confidence level. For example, the prefetcher 150 determines whether the confidence value field 222 associated with the path satisfies a threshold level. If the path does not have a high confidence level, method 470 generates a no prediction signal in block 483. Otherwise, method 470 may proceed to block 485 where the age value field 223 associated with the path is incremented. In block 486, if the recent count field 227 is greater than or equal to the main count field 225, method proceed to block 487 where the recent value field 226 is return as the predicted offset value. Otherwise, method proceed to block 488 where the main value field 224 is return as the predicted offset value for prefetching data based on the trigger IP 211.

Figure 5:
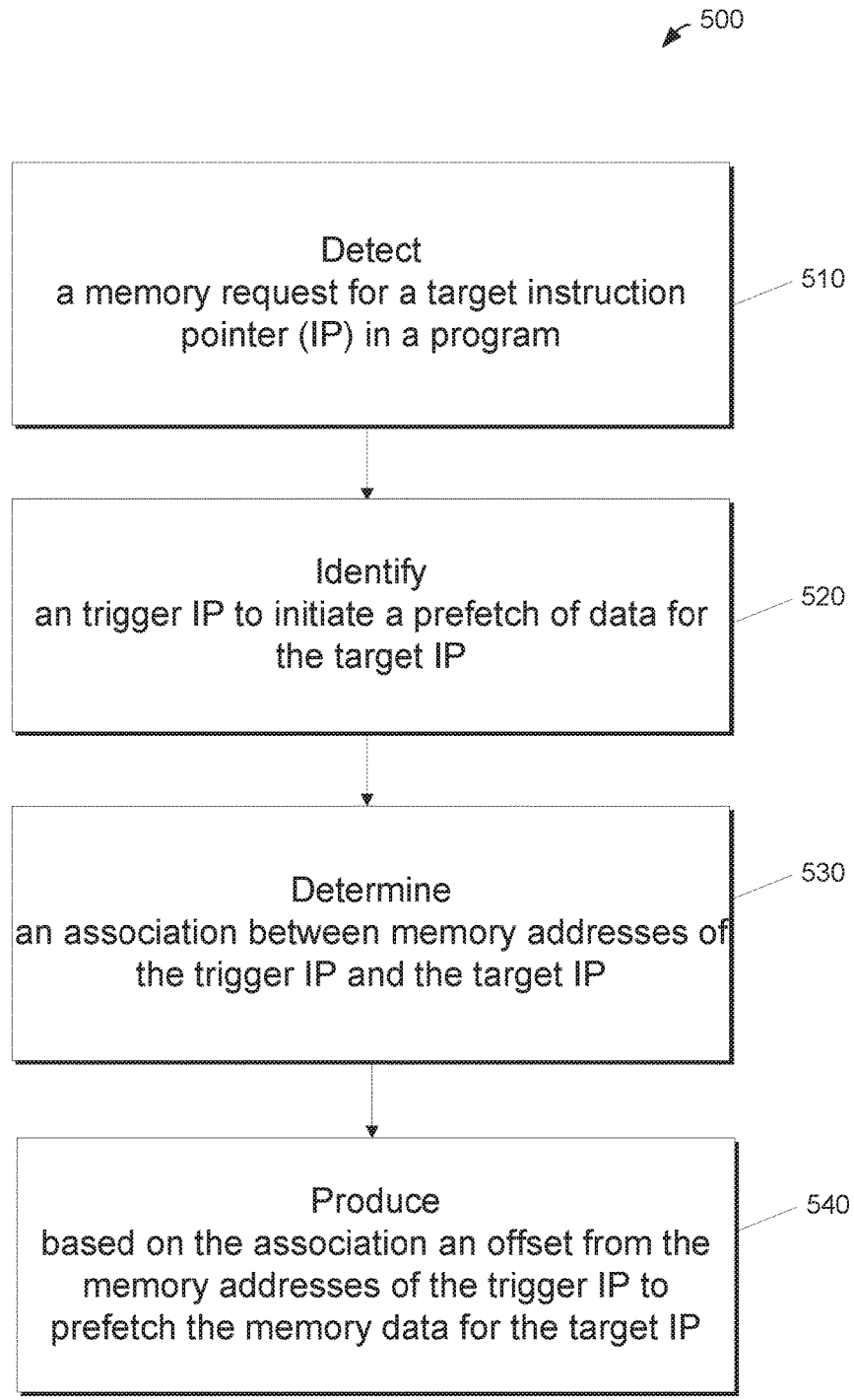
FIG. 5 illustrates a flow diagram of a method for supporting timely and context triggered prefetching in microprocessors according to an embodiment of the disclosure.

FIG. 5 illustrates a flow diagram of a method 500 for supporting TACT prefetching in microprocessors. Method 500 may be performed by processing logic that may comprise hardware (e.g., circuitry, dedicated logic, programmable logic, microcode, etc.), software (such as instructions run on a processing device), firmware, or a combination thereof. In one embodiment, the prefetcher circuit 150 as directed by the TACT prefetching logic 155 of processing device 100 in FIG. 1 can perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Referring to FIG. 5, method 500, in block 510 detects a memory request 203, 205, 207, 209 for a target instruction pointer (IP) 210 in a program 140. In block 520, a trigger IP 211 to initiate a prefetch of memory data 201 for the target IP 210 is identified. In block 530, an association 220 between memory addresses 212 of the trigger IP 211 and the target IP 210. The association 200 is a series of offsets 215, 217 representing a path 221 between an instance of the trigger IP 211 in memory 201 and the target IP 210. In block 540, an offset 215, 217 from the memory address 212 of the trigger IP 211 to prefetch the memory data 201 for the target IP 210 is produced based on the association 221.

Figure 6:
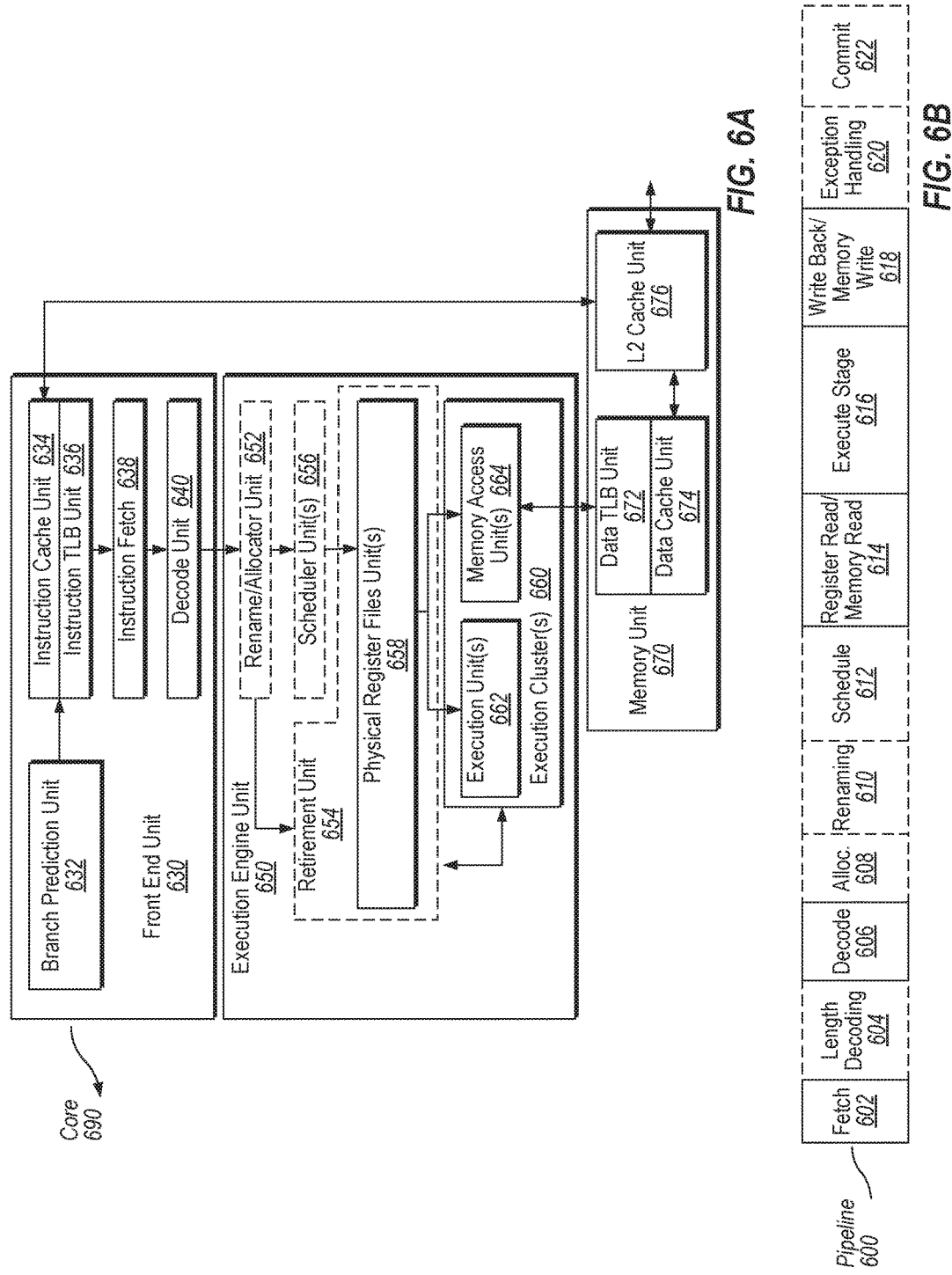
FIG. 6A is a block diagram illustrating a micro-architecture for a processor according to an embodiment of the disclosure.
FIG. 6B is a block diagram illustrating an in-order pipeline and a register renaming stage, out-of-order issue/execution pipeline according to an embodiment of the disclosure.

FIG. 6A is a block diagram illustrating a micro-architecture for a processor 600 that implements techniques for supporting TACT prefetching in microprocessors in accordance with one embodiment of the disclosure. Specifically, processor 600 depicts an in-order architecture core and a register renaming logic, out-of-order issue/execution logic to be included in a processor according to at least one embodiment of the disclosure. In one implementation, processor 600 is the same as processor 100 to perform TACT prefetching described with respect to FIG. 1.

Processor 600 includes a front-end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware embodiments, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one embodiment, processor 600 may be the same as processing device 100 described with respect to FIG. 1 supporting TACT prefetching in microprocessors as described with respect to embodiments of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming is used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
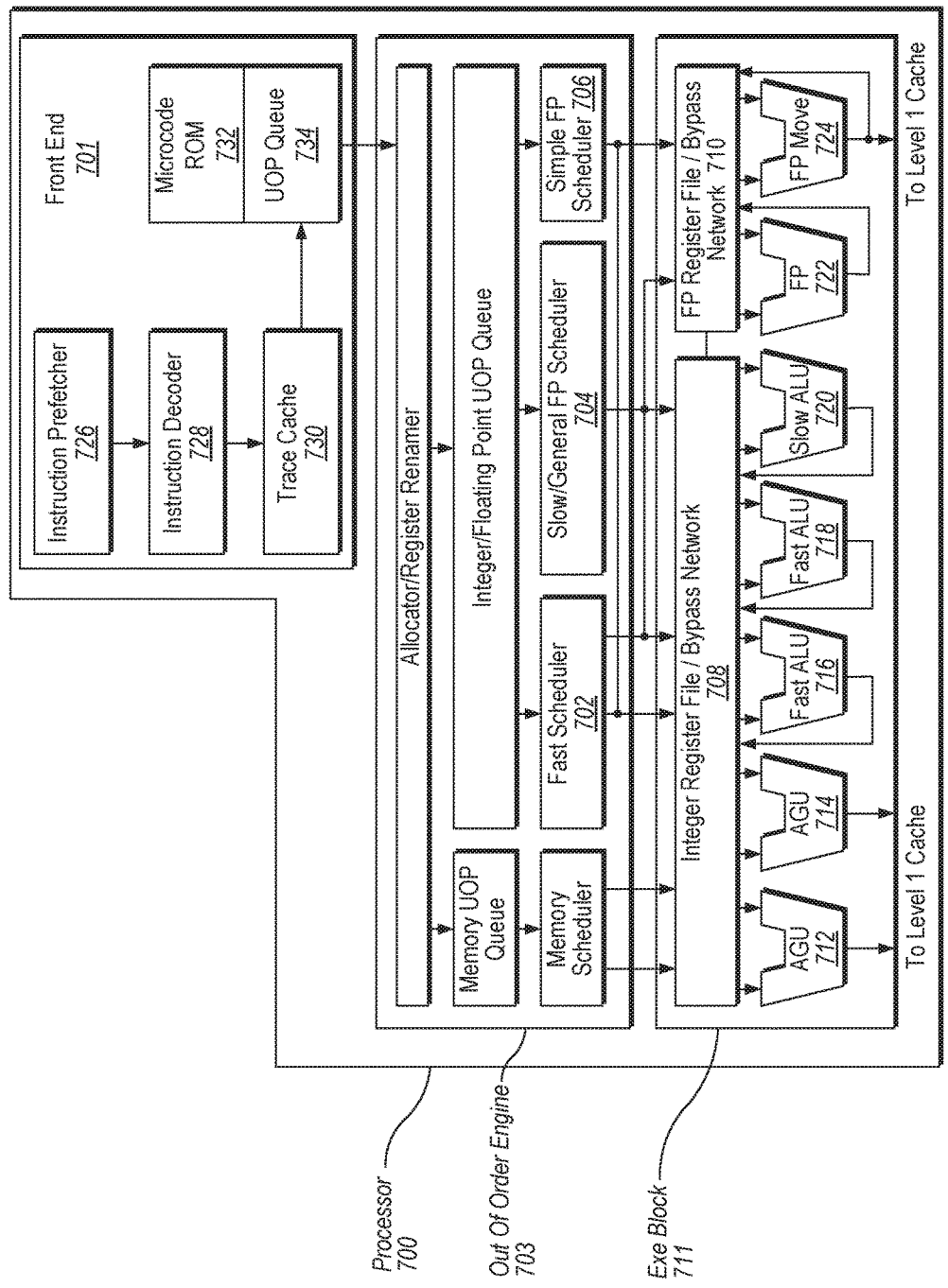
FIG. 7 is a block diagram illustrating a micro-architecture for a processor in accordance with one embodiment of the disclosure.

FIG. 7 illustrates a block diagram of the micro-architecture for a processor 700 that includes logic circuits to implement techniques for supporting TACT prefetching in microprocessors in accordance with one embodiment of the disclosure. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct microinstruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710, for integer and floating-point operations, respectively. Each register file 708, 710, of one embodiment also includes a bypass network that can bypass or forward just completed results that have not yet been written into the register file to new dependent uops. The integer register file 708 and the floating-point register file 710 are also capable of communicating data with the other.

For one embodiment, the integer register file 708 is split into two separate register files, one register file for the low order 32 bits of data and a second register file for the high order 32 bits of data. The floating-point register file 710 of one embodiment has 128 bit wide entries because floating-point instructions typically have operands from 64 to 128 bits in width.

The execution block 711 contains the execution units 712, 714, 716, 718, 720, 722, 724, where the instructions are actually executed. This section includes the register files 708, 710 that store the integer and floating point data operand values that the microinstructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating-point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. The AGUs 712, 714 may execute memory load/store operations. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating-point units 722, 724, can be implemented to support a range of operands having bits of various widths. For one embodiment, the floating-point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store TACT prefetching logic 155 according to embodiments of the disclosure. In one embodiment, the execution block 711 of processor 700 may include a prefetcher 150 for implementing techniques for supporting TACT prefetching in microprocessors in accordance with one embodiment of the disclosure. In some embodiments, processor 700 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. In one embodiment, a register file also includes eight (8) multimedia SIMD register(s) for the packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
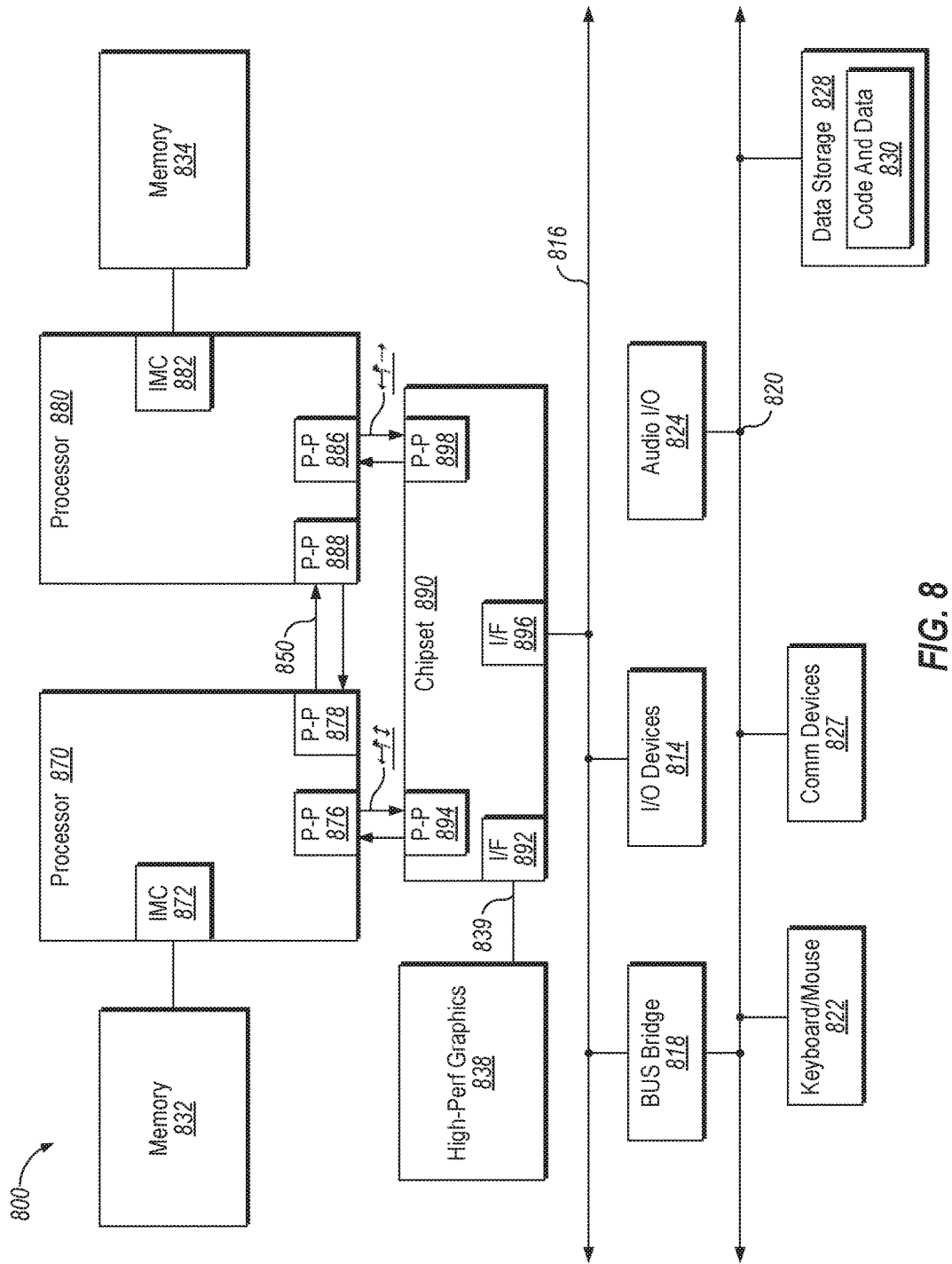
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for supporting TACT prefetching in microprocessors as described herein. In some embodiments, the two processors 870, 880 are the processing device 100 of FIG. 1.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point-to-point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
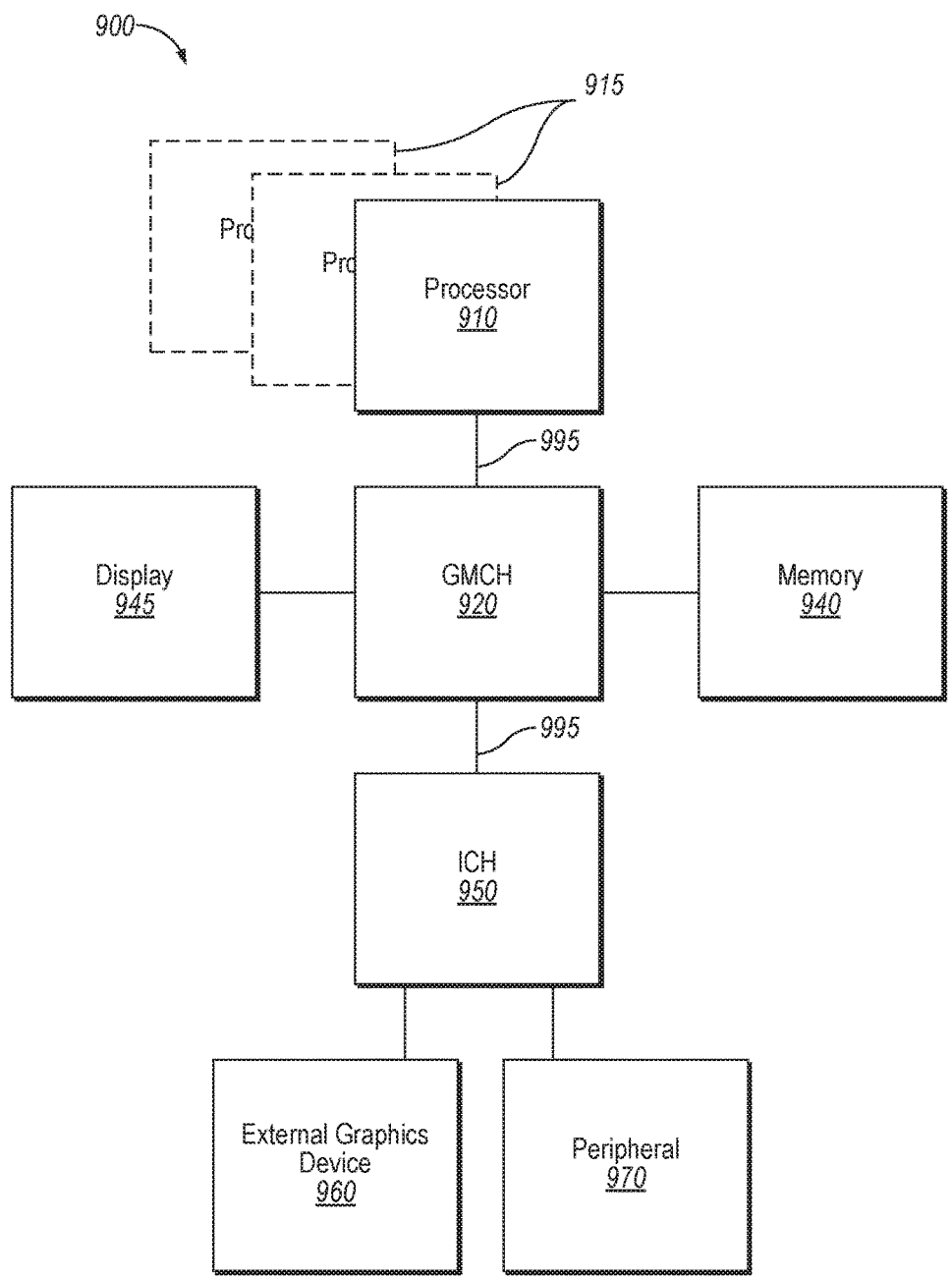
FIG. 9 is a block diagram illustrating a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 provide for supporting TACT prefetching in microprocessors according to embodiments of the disclosure. In some embodiments, the processors 910, 915 are the processing device 100 of FIG. 1.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a front side bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
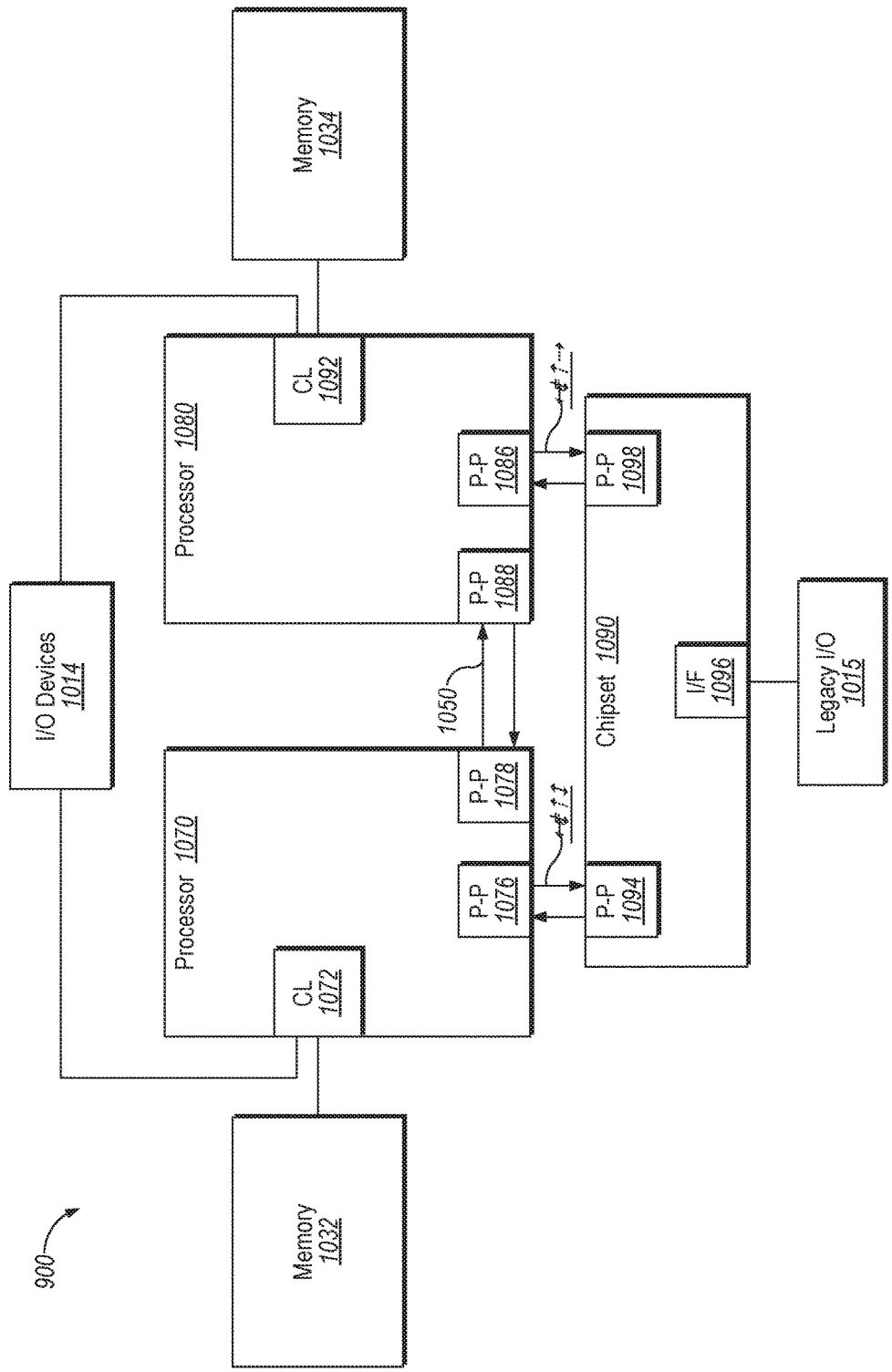
FIG. 10 is a block diagram illustrating a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may provide for supporting TACT prefetching in microprocessors as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096. The embodiments of the processing device 100 of FIG. 1 may be implemented in processor 1070, processor 1080, or both.

Figure 11:
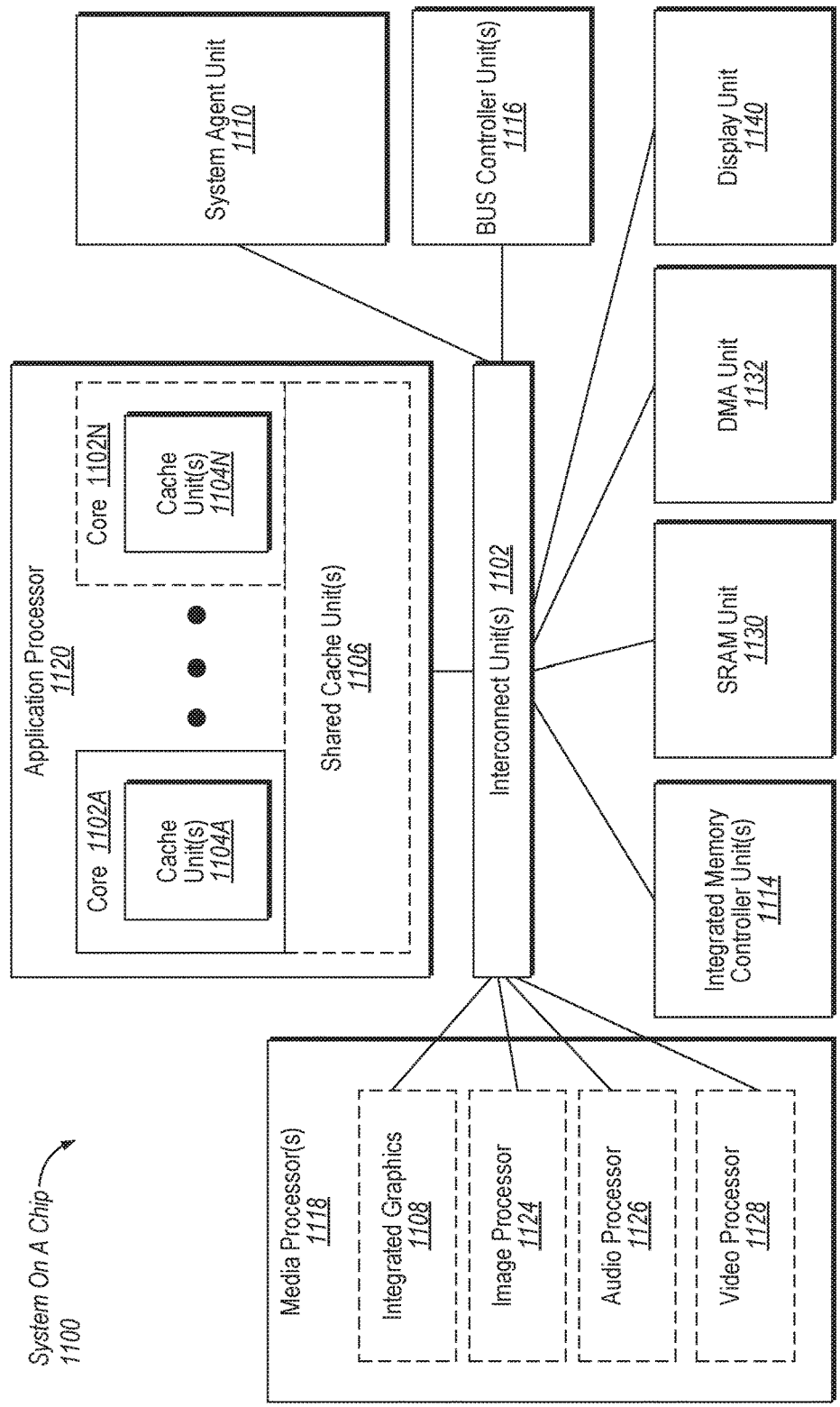
FIG. 11 is a block diagram illustrating a System-on-a-Chip (SoC) according to an embodiment of the disclosure.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set of one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The SoC 1100 also includes logic to implement store TACT prefetching logic 155 according to embodiments of the disclosure. In one embodiment, the execution block 711 of SoC 1100 may include a prefetcher 150 for implementing techniques for supporting TACT prefetching in microprocessors in accordance with one embodiment of the disclosure. In some embodiments, SoC 1100 may be the processing device 100 of FIG. 1.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
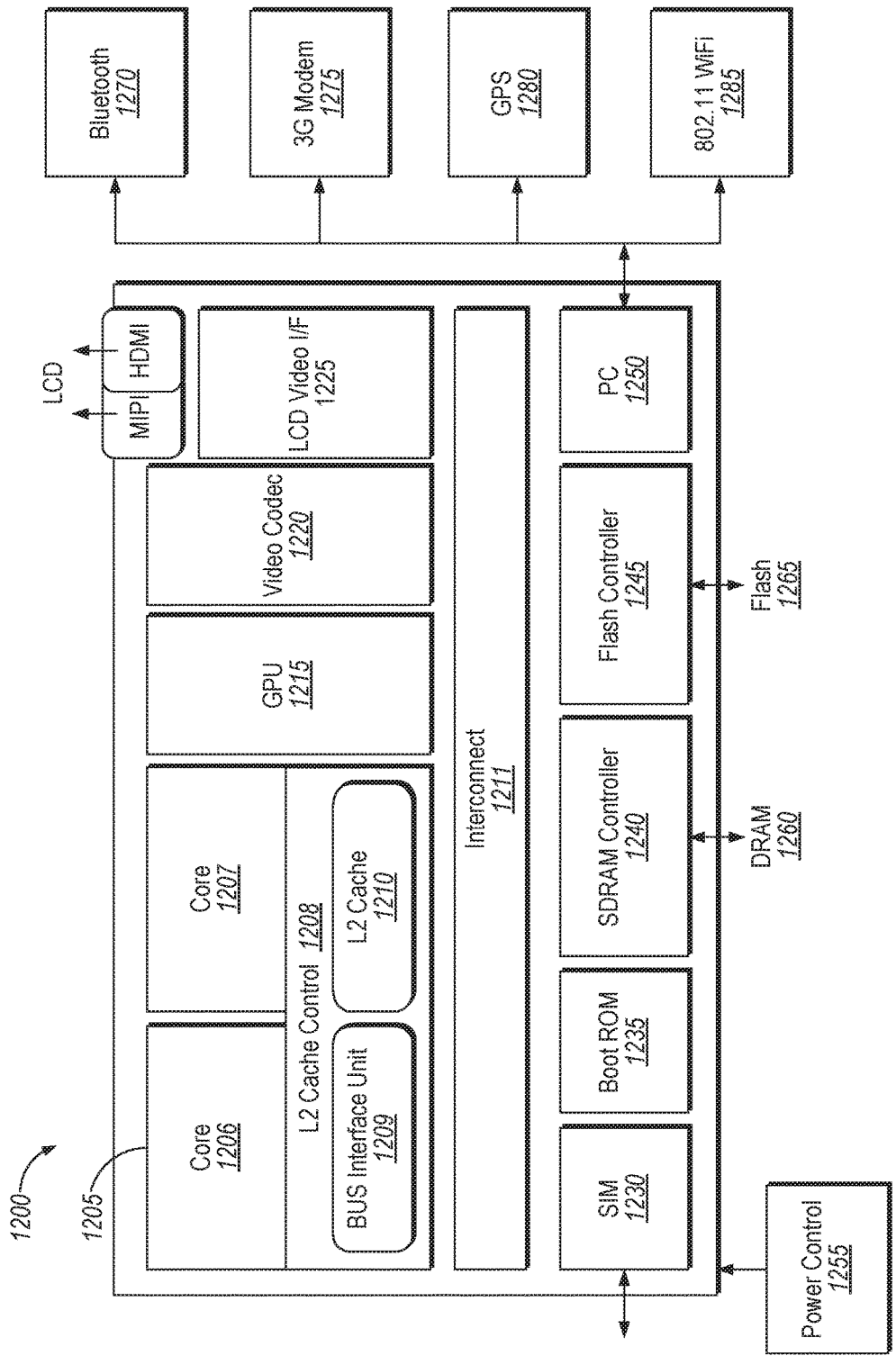
FIG. 12 is a block diagram illustrating a SoC design according to an embodiment of the disclosure.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may provide for supporting TACT prefetching in microprocessors as described in embodiments herein. In some embodiments, the cores 1206, 1207 are the processing cores 110 of FIG. 1.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1247 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
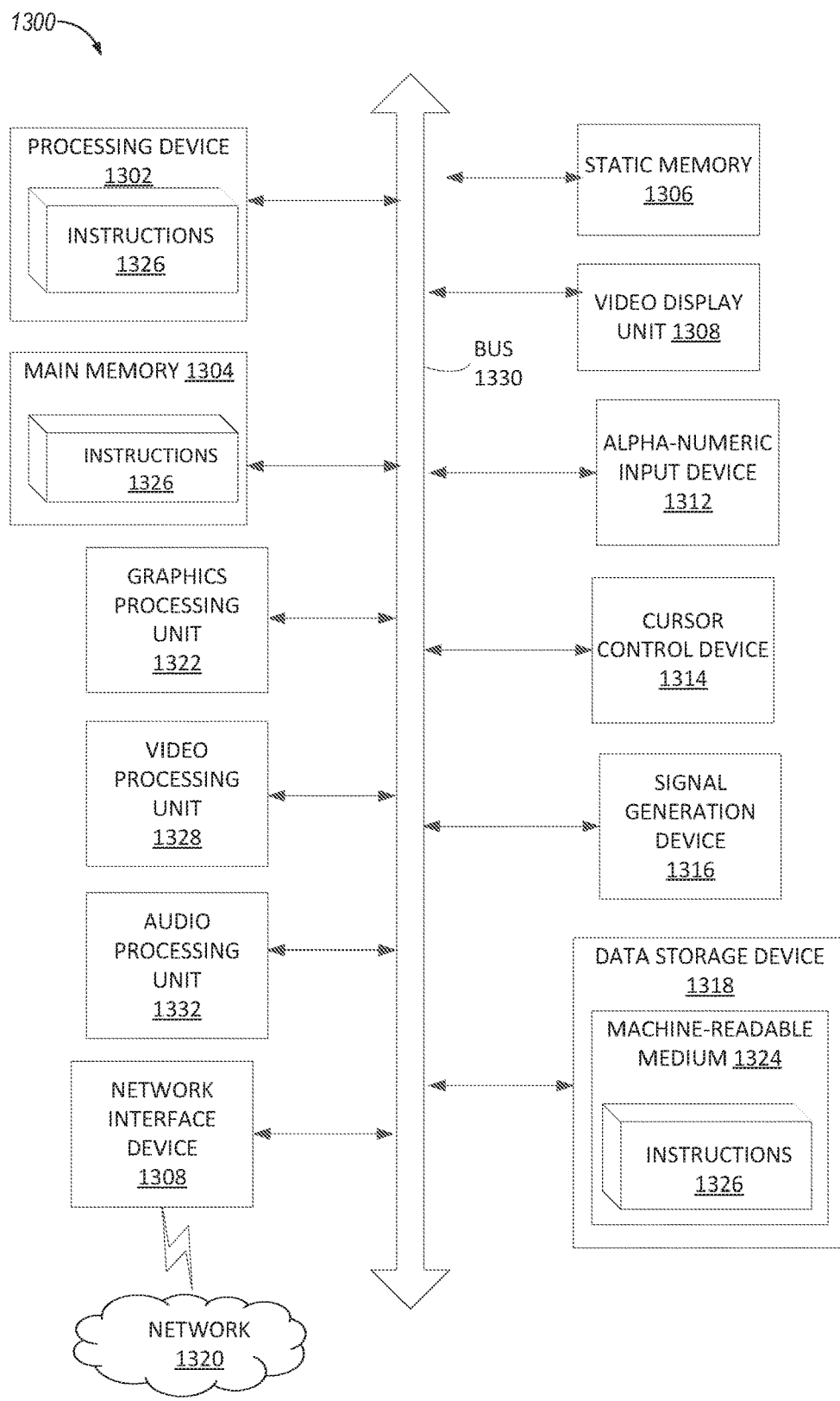
FIG. 13 illustrates a block diagram illustrating a computer system according to an embodiment of the disclosure.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or more processing cores. The processing device 1302 is configured to execute the processing logic 1326 for performing the operations and steps discussed herein. In one embodiment, processing device 1302 is the same as processing device 100 described with respect to FIG. 1 that implement techniques for supporting TACT prefetching in microprocessors as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics-processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing TACT prefetching logic 155 in processing device 100 for FIG. 1, as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media. In some embodiments, data storage device 1318 may include a non-transitory computer-readable storage medium, such as computer-readable storage medium 1324, on which may store instructions 1326 encoding any one or more of the methods or functions described herein, including instructions encoding the techniques including the prefetcher 150 of FIG. 1 for implementing the TACT prefetching logic 155.

The machine-readable storage medium 1324 may also be used to store instructions 1326 implementing TACT prefetching logic 155 instructions on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: an execution unit; and a prefetcher circuit communicably coupled to the execution unit, the prefetcher circuit to: detect a memory request for a target instruction pointer (IP) in a program to be executed by the execution unit; identify a trigger IP to initiate a prefetch operation of memory data for the target IP; determine an association between memory addresses of the trigger IP and the target IP, the association comprising a series of offsets representing a path between the trigger IP and an instance of the target IP in memory; and produce, based on the association, an offset from the memory addresses of the trigger IP to prefetch the memory data for the target IP.

Example 2 includes the processing device of Example 1, wherein the prefetcher circuit is further to determine whether an amount of time to access the memory data associated with the target IP satisfies a threshold amount of latency.

Example 3 includes the processing device of Example 2, wherein the prefetcher circuit is further to determine a ranking value for the target IP, the ranking value to indicate a count of an amount of times that the access for the memory data is served at the threshold amount latency.

Example 4 includes the processing device of Example 1, wherein to identify the trigger IP, the prefetcher circuit is further to track IPs of the program, each of the IPs to access an address region corresponding to the target IP.

Example 5 includes the processing device of Example 4, wherein the prefetcher circuit is further to identify at least one IP of the tracked IPs as the trigger IP based on a number of times the at least one IP accessed the address region.

Example 6 includes the processing device of Example 1, wherein the series of offsets representing the path satisfies a threshold distance between the trigger IP and the instance of the target IP.

Example 7 includes the processing device of Example 1, wherein to produce the offset, the prefetcher circuit is further to: identify a prediction offset from a pattern table based on the path; and determine whether a confidence value for the prediction offset satisfies a threshold level.

Example 8 include the processing device of Example 1, further comprising a memory device comprising a data structure to store the offset associated with the trigger IP and the target IP.

Example 9 includes a method comprising: detecting, by a processing device, a memory request for a target instruction pointer (IP) in a program to be executed by the execution unit; identifying, by the processing device, a trigger IP to initiate a prefetch operation of memory data for the target IP; determining, by the processing device, an association between memory addresses of the trigger IP and the target IP, the association comprising a series of offsets representing a path between the trigger IP and an instance of the target IP in memory; and producing, by the processing device based on the association, an offset from the memory addresses of the trigger IP to prefetch the memory data for the target IP.

Example 10 include the method of Example 9, further comprising determining whether an amount of time to access the memory data associated with the target IP satisfies a threshold amount of latency.

Example 11 includes the method of Example 10, further comprising determining a ranking value for the target IP, the ranking value to indicate a count of an amount of times that the access for the memory data is served at the threshold amount latency.

Example 12 includes the method of Example 9, wherein identifying the trigger IP, further comprises tracking IPs of the program, each of the IPs to access an address region corresponding to the target IP.

Example 13 includes the method of Example 12, further comprising identifying at least one IP of the tracked IPs as the trigger IP based on a number of times the at least one IP accessed the address region.

Example 14 includes the method of Example 9, wherein the series of offsets representing the path satisfies a threshold distance between the trigger IP and the instance of the target IP.

Example 15 includes the method of Example 9, wherein producing the offset further comprises: identifying a prediction offset from a pattern table based on the path; and determining whether a confidence value for the prediction offset satisfies a threshold level.

Example 16 includes a system comprising a memory; and a processing core, operatively coupled to the memory, to: detect a memory request for a target instruction pointer (IP) in a program to be executed by the processing core; identify a trigger IP to initiate a prefetch operation of memory data for the target IP; determine an association between memory addresses of the trigger IP and the target IP, the association comprising a series of offsets representing a path between the trigger IP and an instance of the target IP in the memory;

and produce, based on the association, an offset from the memory addresses of the trigger IP to prefetch the memory data for the target IP.

Example 17 includes the system of Example 16, wherein the processing core is further to determine whether an amount of time to access the memory data associated with the target IP satisfies a threshold amount of latency.

Example 18 includes the system of Example 17, wherein the processing core is further to determine a ranking value for the target IP, the ranking value to indicate a count of an amount of times that the access for the memory data is served at the threshold amount latency.

Example 19 includes the system of Example 16, wherein to identify the trigger IP, the processing core is further to track IPs of the program, each of the IPs to access an address region corresponding to the target IP.

Example 20 includes the system of Example 19, wherein the processing core is further to identify at least one IP of the tracked IPs as the trigger IP based on a number of times the at least one IP accessed the address region.

Example 21 includes the system of Example 16, wherein the series of offsets representing the path satisfies a threshold distance between the trigger IP and the instance of the target IP.

Example 22 includes the system of Example 16, wherein to produce the offset, the processing core is further to: identify a prediction offset from a pattern table based on the path; and determine whether a confidence value for the prediction offset satisfies a threshold level.

Example 23 includes a non-transitory computer-readable medium comprising instructions that, when executed by a processing device, cause the processing device to: detect, by the processing device, a memory request for a target instruction pointer (IP) in a program to be executed by the processing core; identify a trigger IP to initiate a prefetch operation of memory data for the target IP; determine an association between memory addresses of the trigger IP and the target IP, the association comprising a series of offsets representing a path between the trigger IP and an instance of the target IP in the memory; and produce, based on the association, an offset from the memory addresses of the trigger IP to prefetch the memory data for the target IP.

Example 24 includes the non-transitory computer-readable medium of Example 23, wherein the processing device is further to determine whether an amount of time to access the memory data associated with the target IP satisfies a threshold amount of latency.

Example 25 includes the non-transitory computer-readable medium of Example 24, wherein the processing device is further to determine a ranking value for the target IP, the ranking value to indicate a count of an amount of times that the access for the memory data is served at the threshold amount latency.

Example 26 includes the non-transitory computer-readable medium of Example 23, wherein to identify the trigger IP, the processing core is further to track IPs of the program, each of the IPs to access an address region corresponding to the target IP.

Example 27 includes the non-transitory computer-readable medium of Example 26, wherein the processing device is further to identify at least one IP of the tracked IPs as the trigger IP based on a number of times the at least one IP accessed the address region.

Example 28 includes the non-transitory computer-readable medium of Example 23, wherein the series of offsets representing the path satisfies a threshold distance between the trigger IP and the instance of the target IP.

Example 29 includes the non-transitory computer-readable medium of Example 23, wherein to produce the offset, the processing device is further to: identify a prediction offset from a pattern table based on the path; and determine whether a confidence value for the prediction offset satisfies a threshold level.

Example 30 includes a non-transitory, computer-readable storage medium including instructions that, when executed by a processor, cause the processor to perform the method of Examples 9-15.

Example 31 includes an apparatus comprising: a plurality of functional units of a processor; means for detecting a memory request for a target instruction pointer (IP) in a program to be executed by the execution unit; means for identifying a trigger IP to initiate a prefetch operation of memory data for the target IP; means for determining an association between memory addresses of the trigger IP and the target IP, the association comprising a series of offsets representing a path between the trigger IP and an instance of the target IP in memory; and means for producing, based on the association, an offset from the memory addresses of the trigger IP to prefetch the memory data for the target IP.

Example 32 includes the apparatus of Example 31, further comprising the subject matter of any of Examples 1-8 and 16-22.

Example 33 includes a system-on-a-chip (SoC) comprising: a memory device and a processor comprising a memory controller unit, wherein the processor is configured to perform the method of any of Examples 9-15.

Example 34 includes the SoC of Example 33, further comprising the subject matter of any of Examples 1-8 and 16-22.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code to be executed by the micro-controller. Therefore, reference to a module, in one embodiment, refers to the hardware, which is specifically conFIG.d to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of to, 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, the values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   an execution unit; and
   a prefetcher circuit communicably coupled to the execution unit, the prefetcher circuit to:
   detect a memory request for a target instruction pointer (IP) in a program to be executed by the execution unit;
   identify a trigger IP to initiate a prefetch operation of memory data for the target IP;
   determine an association between memory addresses of the trigger IP and the target IP, the association comprising a series of offsets representing a path between the trigger IP and an instance of the target IP in memory; and
   produce, based on the association, an offset from the memory addresses of the trigger IP and the target IP to prefetch the memory data for the target IP.

2. The processing device of claim 1, wherein the prefetcher circuit is further to determine whether an amount of time to access the memory data associated with the target IP satisfies a threshold amount of latency.

3. The processing device of claim 2, wherein the prefetcher circuit is further to determine a ranking value for the target IP, the ranking value to indicate a count of an amount of times that the access for the memory data is served at the threshold amount latency.

4. The processing device of claim 1, wherein to identify the trigger IP, the prefetcher circuit is further to track IPs of the program, each of the IPs to access an address region corresponding to the target IP.

5. The processing device of claim 4, wherein the prefetcher circuit is further to identify at least one IP of the tracked IPs as the trigger IP based on a number of times the at least one IP accessed the address region.

6. The processing device of claim 1, wherein the series of offsets representing the path satisfies a threshold distance between the trigger IP and the instance of the target IP.

7. The processing device of claim 1, wherein to produce the offset, the prefetcher circuit is further to:
   identify a prediction offset from a pattern table based on the path; and
   determine whether a confidence value for the prediction offset satisfies a threshold level.

8. The processing device of claim 1, further comprising a memory device comprising a data structure to store the offset associated with the trigger IP and the target IP.

9. A method comprising:
   detecting, by a processing device, a memory request for a target instruction pointer (IP) in a program to be executed by the execution unit;
   identifying, by the processing device, a trigger IP to initiate a prefetch operation of memory data for the target IP;
   determining, by the processing device, an association between memory addresses of the trigger IP and the target IP, the association comprising a series of offsets representing a path between the trigger IP and an instance of the target IP in memory; and
   producing, by the processing device based on the association, an offset from the memory addresses of the trigger IP and the target IP to prefetch the memory data for the target IP.

10. The method of claim 9, further comprising determining whether an amount of time to access the memory data associated with the target IP satisfies a threshold amount of latency.

11. The method of claim 10, further comprising determining a ranking value for the target IP, the ranking value to indicate a count of an amount of times that the access for the memory data is served at the threshold amount latency.

12. The method of claim 9, wherein identifying the trigger IP, further comprises tracking IPs of the program, each of the IPs to access an address region corresponding to the target IP.

13. The method of claim 12, further comprising identifying at least one IP of the tracked IPs as the trigger IP based on a number of times the at least one IP accessed the address region.

14. The method of claim 9, wherein the series of offsets representing the path satisfies a threshold distance between the trigger IP and the instance of the target IP.

15. The method of claim 9, wherein producing the offset further comprises:
   identifying a prediction offset from a pattern table based on the path; and
   determining whether a confidence value for the prediction offset satisfies a threshold level.

16. A system comprising:
   a memory; and
   a processing core, operatively coupled to the memory, to:
   detect a memory request for a target instruction pointer (IP) in a program to be executed by the processing core;
   identify a trigger IP to initiate a prefetch operation of memory data for the target IP;
   determine an association between memory addresses of the trigger IP and the target IP, the association comprising a series of offsets representing a path between the trigger IP and an instance of the target IP in the memory; and
   produce, based on the association, an offset from the memory addresses of the trigger IP and the target IP to prefetch the memory data for the target IP.

17. The system of claim 16, wherein the processing core is further to determine whether an amount of time to access the memory data associated with the target IP satisfies a threshold amount of latency.

18. The system of claim 17, wherein the processing core is further to determine a ranking value for the target IP, the ranking value to indicate a count of an amount of times that the access for the memory data is served at the threshold amount latency.

19. The system of claim 16, wherein to identify the trigger IP, the processing core is further to track IPs of the program, each of the IPs to access an address region corresponding to the target IP.

20. The system of claim 19, wherein the processing core is further to identify at least one IP of the tracked IPs as the trigger IP based on a number of times the at least one IP accessed the address region.

* * * * *